(No Model.)

J. McCAFFREY.
LOOSE PULLEY FOR SHAFTS.

No. 309,554. Patented Dec. 23, 1884.

Witnesses
S. N. Piper
E. B. Pratt

Inventor,
John McCaffrey,
by R. H. Eddy atty

United States Patent Office.

JOHN McCAFFREY, OF LAWRENCE, MASSACHUSETTS, ASSIGNOR, BY MESNE ASSIGNMENTS, TO HIMSELF AND CHARLES H. SMITH, OF SAME PLACE.

LOOSE PULLEY FOR SHAFTS.

SPECIFICATION forming part of Letters Patent No. 309,554, dated December 23, 1884.

Application filed October 1, 1884. (No model.)

*To all whom it may concern:*

Be it known that I, JOHN McCAFFREY, of Lawrence, in the county of Essex, of the Commonwealth of Massachusetts, have invented a new and useful Improvement in Loose Pulleys for Shafts; and I do hereby declare the same to be described in the following specification and represented in the accompanying drawings, of which—

Figure 1:
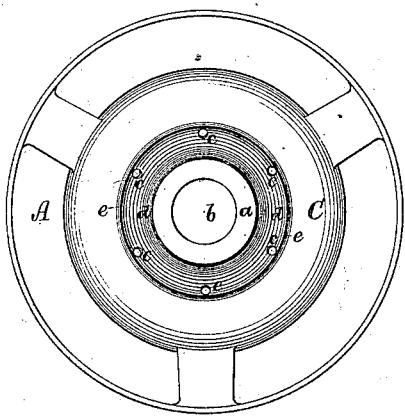

Figure 1 is a side view, Fig. 2 a transverse section, and Fig. 3 a longitudinal section, of a loose pulley provided with my invention, the nature of which is defined in the claim hereinafter presented.

Figure 4:
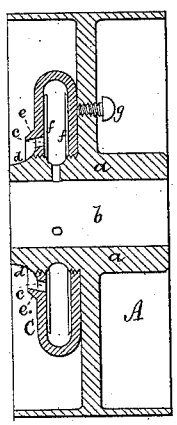
Figure 5:
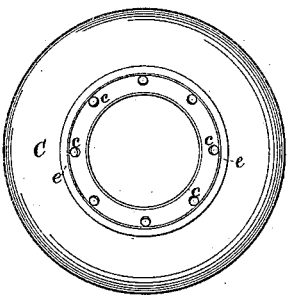
Figure 6:
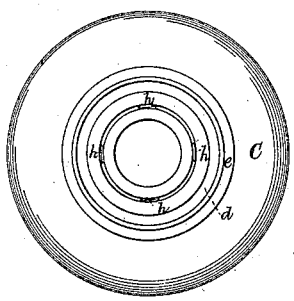
Figure 7:
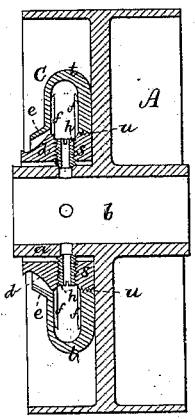

In the said figures the said invention is represented as integral with the pulley, but in Figs. 4 and 7, which are transverse sections of a loose pulley, the invention is represented as constructed separately from and fixed to the pulley, Figs. 5 and 6 being side views of it.

In accordance with my improvement the loose pulley is provided with an oiling-chamber encompassing the eye of the hub of the pulley and opening therein, and furnished with one or a series of inducts for supplying it, the said chamber, with oil or a lubricating-fluid. Furthermore, there is projected from such chamber or the part containing it a tapering guide and a flange encompassing such guide, the induct or inducts for the passage of the oil into the chamber being between the said guide and flange. Within the chamber there are one or more radial or other proper-shaped ribs or projections to prevent or hinder the oil from revolving in the chamber relatively thereto. Such ribs may be curved in a manner to intercept the oil while the pulley may be in revolution, and force it toward the eye of the pulley and prevent it by centrifugal force from being packed at the circumference of the chamber.

In the drawings, A denotes the loose pulley, of which $a$ is the hub and $b$ the cylindrical eye thereof for receiving the shaft on which the pulley is to run.

Figure 2:
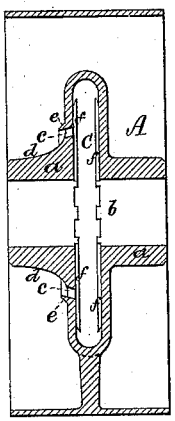
Figure 3:
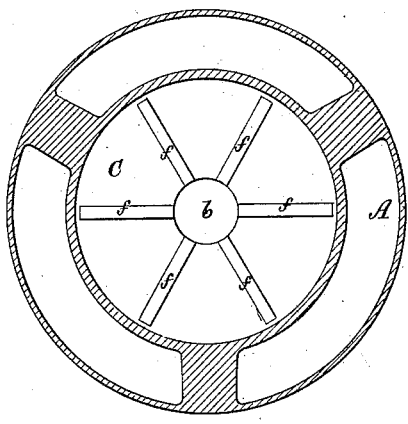

In Figs. 1, 2, and 3 the oiling-chamber is shown at C as formed within the hub or as integral therewith, and around and opening directly into the eye $b$, and provided with a series of lateral inducts, $c$, extending into it from a conical or a tapering surface or guide, $d$, formed on and around the hub in manner as represented. Besides the said guide the oiling-chamber is furnished with an annular flange, $e$, which is concentric with the guide and the series of inducts, or is arranged therewith as represented. When the pulley may be in revolution on the shaft, if oil be poured upon the guide, such oil will be caused by centrifugal force to pass up the guide and into an annular space between it and the flange, and thence through the induct or inducts into the lubricating-chamber, which is shown as having on each of its inner opposite sides a series of radial ribs or projections, $f$. The annular flange serves to intercept the oil and direct it into the induct or inducts. Without the flange the oil would be thrown off the hub, or part in which the chamber is formed, without passing into the chamber.

In Fig. 4 the oiling vessel or chamber is shown as made separately from and screwed upon the hub of the pulley and held by a check-screw, $g$, from revolving on the hub independently thereof.

In Fig. 7 the oiling vessel or chamber is represented as made separate from the hub and in two parts, $s\ t$, the part $s$ being first secured to the hub and adjusted into concentricity therewith by four tubular screws, $h$, the part $t$ being screwed on the part $s$, as shown at $u$.

With my invention the loose pulley, while in revolution, can be supplied with oil and need not be stopped for such purpose, it being only necessary to pour the oil upon the tapering guide, which, with the encompassing annular flange, will direct such oil to the inducts of the chamber and cause it to flow through them into the said chamber.

I claim—

A loose pulley provided with an oiling-chamber, furnished on its inner surface with ribs or projections and encompassing its hub-eye and opening therein, such chamber having one or more lateral inducts and a tapering guide, and an annular flange arranged therewith, all being substantially as set forth.

JOHN McCAFFREY.

Witnesses:
  W. FISK GILE,
  OCTAVIUS T. HOWE.